3,264,372
POLYESTER RESIN COMPOSITION

William George Deichert, Flushing, N.Y., and Richard Lansing Webb, Darien, Conn., assignors to American Cyanamid Company, Stamford, Conn., a corporation of Maine
No Drawing. Filed Sept. 10, 1963, Ser. No. 307,812
15 Claims. (Cl. 260—872)

This invention relates to a substantially linear, water-insoluble non-gelled unsaturated polyester resin composition consisting essentially of the blend of (1) the esterification reaction product of fumaric acid and certain polyethylene glycols and (2) certain glycol diacrylates. Still further this invention relates to a hard mar-resistant cross-linked unsaturated polyester resin prepared from the composition set forth hereinabove. Still further this invention relates to articles of manufacture comprising a substrate coated with the unsaturated polyester resin composition and converted to the hard mar-resistant cross-linked state.

One of the objects of the present invention is to produce a substantially linear, water-insoluble, non-gelled unsaturated polyester resin composition consisting essentially of a blend of (1) the esterification reaction product of fumaric acid and certain polyethylene glycols and (2) certain glycol diacrylates. A further object of the present invention is to produce a hard mar-resistant cross-linked polyester resin product from the aforementioned polyester resin composition. Still further this invention relates to articles of manufacture comprising a base member coated with the aforementioned hard mar-resistant cross-linked polyester resin. These and other objects of the present invention will be discussed in greater detail hereinbelow.

The substantially linear, water-insoluble, non-gelled unsaturated polyester resin composition of the present invention consists essentially of a blend of two components. Insignificant amounts of other additives which have no serious detrimental effect on the properties of the ultimate product are within the contemplations of the present invention.

The first component of the present invention is the esterification reaction product produced by reacting components consisting essentially of fumaric acid and a polyglycol wherein said glycol contains between 6 and 26 carbon atoms. The esterification reaction between the fumaric acid and the polyethylene glycol is carried out until an acid number below about 30 is reached.

Among the polyethylene glycols which may be used to esterify the fumaric acid are triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol and tridecaethylene glycol. These polyethylene glycols may be used either singly or in combination with one another. In the practice of the process of the present invention relating to the preparation of this polyester resin composition, the fumaric acid and the polyethylene glycol will be used in substantially equimolar proportions, since each is, for the purposes of esterification, difunctional. For preferred processing results, a slight excess amounting to about 5 to 20% of the polyethylene glycol should be used over and beyond the amount stoichiometrically calculated to esterify substantially all of the carboxyl groups in the fumaric acid.

The second component of the present invention namely, the glycol diacrylates, are prepared by esterifying an alpha, beta, ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene glycol, bis(4-hydroxybutyl)-ether. Among the monoglycols which may be used to esterify the acrylic acids are ethylene glycol, propyleneglycol, and the propanediols-1,2 and 1,3 and the butanediols-1,2; 1,3; and 1,4. These glycol diacrylates can be used with the glycol fumarates either singly or in combination with one another. However, whether used singly or in combination, the glycol diacrylate should be present in the total composition in an amount varying between about 10% and 40% by weight based on the total weight of said glycol fumarate and said glycol diacrylate.

It has been pointed out hereinabove that the substantially linear, water-insoluble, non-gelled unsaturated polyester resin composition of the present invention can be converted to a hard mar-resistant product. This conversion from the ungelled or thermosetting state to the hard thermoset state can be accomplished by the application of heat and/or pressure with or without catalysis. Still further the thermosetting material can be converted to the thermoset state by use of catalysts or initiaors only without resorting to either heat or pressure. The catalytic materials or polymerization initiators which would be used to make such a conversion in state are well-known in the art and have been used extensively for this purpose. Illustrative catalysts are the peroxide catalysts such as, benzoyl peroxide, tertiary butyl hydroperoxide, ditertiary butyl peroxide, and cumene hydroperoxide, among many others. The ketone peroxides may also be used such as, the methyl ethyl ketone peroxide, the diethylketone peroxide and the like. The amounts of the catalytic material used will be conventional such as between about 0.01% and 10% and more usually between about 0.1% and 3% by weight based on the weight of the polymerizable composition.

The polymerizable polyester resin compositions of the present invention will have utility in many areas such as in coatings, moldings, castings, and the like. One of the principal end uses for the polymerizable polyester resin compositions of the present invention is in the areas of coating substrates that have a transparent characteristic in order to impart to said substrate a hard mar-resistant surface. More particularly, the polymerizable polyester resin compositions of the present invention can be used to coat glass for window purposes or for television implosion shields, and the like. Additionally, one can use the polymerizable compositions of the present invention to coat lenses as in eye glasses, including sunglasses, binoculars and telescopes and the like. Still further, these polymerizable compositions may be used to coat sheets of synthetic plastic materials such as sheets of polystyrene or polymethyl methacrylate, and the like. If desired, the polyester resin compositions of the present invention may have incorporated therein, ultraviolet light absorbers of which a substantial plurality are well-known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may be incorporated into the polymerizable resin of the present invention thereby permitting changes from a colored glass to a clear glass and vice versa, due to the absence or presence of light, including sunlight. If a permanent coloration is desired in the polymerizable polyester resins of the present invention, that will not defeat the principle desired end use namely, transparency, certain dyes and/or pigments may be dissolved in the unsaturated polymerizable polyester resin in order to achieve a tinting. Furthermore, the polyester resin compositions of the present invention can be rendered translucent or even opaque by use of the appropriate selection of filler and/or pigment in the desired kind and amount especially when being used as a coating for substrates such as wood, metal and opaque filled plastic articles.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

Into a suitable reaction vessel equipped with thermometer, stirrer, inert gas inlet and outlet tubes, there is introduced 126 parts of triethylene glycol and 93 parts of fumaric acid. The charge is heated at about 150–200° C. for a twenty-four hour period, while bubbling carbon dioxide gas through the reaction mixture so as to provide an inert atmosphere. At the end of the reaction period, the product, having an acid number of 17, is a light yellow viscous liquid. Nine parts of the polyester resin thus produced are blended with one part of ethylene glycol dimethacrylate and catalyzed with 0.1 part of benzoyl peroxide. The solution is poured onto a sheet of glass to form a film. Whereupon a sheet of polymethyl methacrylate is placed over the resin solution so as to avoid getting bubbles between the plastic sheet, the resin and/or the glass. A second sheet of glass is positioned over the plastic sheet and the sandwich is clamped together so as to squeeze out excess resins and assure that there will be no warping or distortion during the curing of the resin. The total assembly is then heated at 80° C. for one hour to achieve cure of the polyester resin composition and is then heated for an additional three hours at 110° C. to achieve a post cure. After the assembly has cooled to room temperature, the clamps are removed and the glass panels separated from the plastic sheet. The coated sheet, after flash removal, had the appearance of the uncoated sheet to the naked eye and the thickness of the coating was measured at 0.002 inch. A mar test gave a value of 1 on the coated side and 30 on the uncoated side. In this test, the lower the number, the more mar resistant the sample is.

As contrasted with the excellent mar resistance of the coating of the present invention, polyallyldiglycol carbonate sheet has a value of about 10, a melamine formaldehyde condensation product has a value of about 13, while polyallylmethacrylate had a mar resistant value of about 12.

EXAMPLES 2–8, INCLUSIVE

Example 1 is repeated in substantially all details except for the amount of resin and the amount of the glycol dimethacrylate. Additionally, the polymethyl methacrylate sheet was washed with a 1% solution of bisphenol A polycarbonate in chloroform on the side to be coated. This series of additional formulations were prepared using the same basic polyester resin with different diacrylate cross-linking agents and/or in different proportions and after post curing, were tested for their mar-resistance. The results are shown in the following table:

*Table I*

| Example | Resin percent | Monomer | Mar[1] value A | Mar[2] Value B |
|---|---|---|---|---|
| 2 | 80 | Ethylene glycol dimethacrylate | 4 | 6 |
| 3 | 80 | Triethylene glycol Dimethacrylate. | 3 | 6 |
| 4 | 80 | Tetraethylene glycol Dimethacrylate. | 1 | 5 |
| 5 | 80 | Polyethylene glycol Dimethacrylate. | 1 | 6 |
| 6 | 74 | Triethylene glycol Dimethacrylate. | 1 | 4 |
| 7 | 71 | Tetraethylene glycol Dimethacrylate. | 0 | 6 |
| 8 | 71 | Polyethylene glycol Dimethacrylate. | 1 | 2 |

[1] Using a 4/0 emery polishing paper.
[2] Using a 3/0 emery polishing paper (coarser).

In each of the above runs, the bonding of the film to the substrate is such that it is not possible to separate the film by simple mechanical means.

EXAMPLE 9

A polyester resin is prepared using substantially the same procedure as in the first part of Example 1 except that the glycol is varied. In each of the following instances, the polyester resin to ethyleneglycol dimethacrylate is formulated on a 80/20 weight ratio, respectively. The results of the mar tests are set forth in Table II.

*Table II*

| Approximate Mol. Wt. of glycol used in prep. of resin | Mar Value A |
|---|---|
| 200 | 0. |
| 300 | 0. |
| 400 | 0. |
| 550 | 2. |
| 600 | 0. |
| 1,000 | Poor compatibility at room temperature. Surface hazy and poor cure. |
| 1,450 | Do. |
| 3,350 | Do. |
| 6,750 | Do. |

EXAMPLE 10

A series of other coatings are prepared using the unsaturated polyester resin as prepared in Example 1 but with the monomers set forth hereinbelow wherein the weight ratio between resin and monomer is 60/40, respectively. The results are shown in Table III.

*Table III*

| Monomer: | Mar value A |
|---|---|
| EgDMA | 0 |
| Triallyl cyanurate | 6 |
| Vinyl acetate | 10 |
| Allyl methacrylate | 11 |
| Styrene | 30 |
| Acrylonitrile | 30 |
| Methylmethacrylate | 30 |

COMPARATIVE EXAMPLE 11

A series of polyester resins, not illustrative of the present invention, but seemingly closely related analogously, were prepared using substantially the same technique as in Example 1. The formulations are set forth hereinbelow:

11a. 4 moles maleic anhydride, 2 moles phthalic anhydride, 6.3 moles propylene glycol.
11b. 7 moles maleic anhydride, 5 moles propylene glycol, 2 moles 1,1'-[isopropylidene(P-phenyleneoxy)] di-2-propanol.

11c. 4 moles maleic anhydride, 2 moles tetrachlorophthalic anhydride, 6 moles ethylene glycol.
11d. 1 mole maleic anhydride, 1 mole dipropylene glycol.

Mixtures containing 60 parts of each of the above resins were separately mixed with 40 parts of ethylene glycol dimethacrylate and catalyzed as in Example 1. The polymerizable compositions thus prepared are coated onto polymethyl methacrylate sheets as in Example 1 and baked according to that procedure. The results are shown in the following table:

*Table IV*

| Resin: | Mar value A |
|---|---|
| 11a | 30 |
| 11b | 30 |
| 11c | 30 |
| 11d | 6 |
| Poly(triethylene glycol fumarate) | 0 |

EXAMPLE 12

A mixture of 560 parts of poly(triethylene glycol fumarate), 140 parts of ethylene glycol dimethacrylate and 14 parts of tertiary butyl perbenzoate are added to a casting cell in order to make a ⅛" sheet. The system is slowly heated to 120° C. (1 hour at 100° C., 1 hour at 110° C. and 1 hour at 120° C.). The casting is then post cured at 140° C. for 1 hour and cooled to room temperature over a two hour period. The sheet is clear and has an excellent optical appearance. The sheet has a Barcol hardness of 35 and a mar value of 0 (Method A).

EXAMPLE 13

120 part of triethylene glycol are heated with 76 parts of maleic anhydride as in Example 1 except the temperature of the work was kept at about 210° C. for ten hours until the maleic anhydride had completely isomerized to the fumaric configuration as determined by infrared tests. A solution of 80 parts of the above resin and 20 parts of tetraethylene glycol dimethacrylate is coated onto a sheet of polymethyl methacrylate using the same procedure as in Example 1. The resultant sheet has excellent optical properties and a mar value of 0 (Method A).

EXAMPLE 14

80 parts of triethylene glycol fumarate prepared according to Example 1 are blended with 20 parts of a diacrylate as shown below, and 1 part of benzoyl peroxide. When cast into a sheet as in Example 1 and converted to a hard cross-linked composition, the individual sheets were tested for mar-resistance. The results are shown herein below.

| Example | Diacrylate | Mar Value (A) |
|---|---|---|
| 14a | Diethylene glycol diacrylate | 2 |
| 14b | Triethylene glycol diacrylate | 2 |
| 14c | Neopentyl glycol diacrylate | 0 |

The mar tests referred to hereinabove are accomplished in the following manner:

A spring-loaded cylinder presses a disc of abrasive paper (attached by double-faced masking tape) against the plastic surface with a fixed pressure while the cylinder and disc are rotated manually for one revolution. The rotation is usually made in a 3–5 second period. The number of rings which can be seen with the unaided eye under approximately optimum observing conditions is a measure of sensitivity to marring. The clear samples are examined by placing them slightly off the line from a strong light source and about 10" from the eye.

We claim:

1. A substantially linear, water-insoluble non-gelled unsaturated polyester resin composition consisting essentially of a blend of (1) the esterification reaction product of reactants consisting essentially of fumaric acid and a polyethylene glycol wherein said glycol has between 6 and 26 carbon atoms, said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

2. A substantially linear, water-insoluble non-gelled unsaturated polyester resin composition consisting essentially of a blend of (1) the esterification reaction product of reactants consisting essentially of fumaric acid and triethylene glycol, said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

3. A substantially linear, water-insoluble non-gelled unsaturated polyester resin composition consisting essentially of a blend of (1) the esterification reaction product of reactants consisting essentially of fumaric acid and triethylene glycol, said product has an acid number below about 30 and (2) ethylene glycol dimethacrylate wherein (2) is present in an amount varying between about 10% and 40% by weight based on the total weight of (1) and (2).

4. A substantially linear, water-insoluble non-gelled unsaturated polyester resin composition consisting essentially of a blend of (1) the esterification reaction product of reactants consisting essentially of fumaric acid and triethylene glycol, said product has an acid number below about 30 and (2) triethylene glycol dimethacrylate wherein (2) is present in an amount varying between about 10% and 40% by weight based on the total weight of (1) and (2).

5. A substantially linear, water-insoluble non-gelled unsaturated polyester resin composition consisting essentially of a blend of (1) the esterification reaction product of reactants consisting essentially of fumaric acid and triethylene glycol, said product has an acid number below about 30 and (2) tetraethylene glycol dimethacrylate wherein (2) is present in an amount varying between about 10% and 40% by weight based on the total weight of (1) and (2).

6. A hard mar-resistant cross-linked unsaturated polyester resin composition consisting essentially of the cured reaction product of (1) the esterification reaction product of reactants consisting essentially of fumaric acid and a polyethylene glycol wherein said glycol has between 6 and 26 carbon atoms and said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

7. A hard mar-resistant cross-linked unsaturated polyester resin composition consisting essentially of the cured reaction product of (1) the esterification reaction product of reactants consisting essentially of fumaric acid and triethylene glycol, said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

8. A hard mar-resistant cross-linked unsaturated polyester resin composition consisting essentially of the cured reaction product of (1) the esterification reaction product of reactants consisting essentially of fumaric acid and triethylene glycol, said product has an acid number below about 30 and (2) ethylene glycol dimethacrylate wherein (2) is present in an amount varying between about 10% and 40% by weight based on the total weight of (1) and (2).

9. A hard mar-resistant cross-linked unsaturated polyester resin composition consisting essentially of the cured reaction product of (1) the esterification reaction product of reactants consisting essentially of fumaric acid and triethylene glycol, said product has an acid number below about 30 and (2) triethylene glycol dimethacrylate wherein (2) is present in an amount varying between about 10% and 40% by weight based on the total weight of (1) and (2).

10. A hard mar-resistant cross-linked unsaturated polyester resin composition consisting essentially of the cured reaction product of (1) the esterification reaction product of reactants consisting essentially of fumaric acid and triethylene glycol, said product has an acid number below about 30 and (2) tetraethylene glycol dimethacrylate wherein (2) is present in an amount varying between about 10% and 40% by weight based on the total weight of (1) and (2).

11. A sheet of polymethyl methacrylate having bonded thereto a hard mar-resistant cross-linked unsaturated polyester resin composition consisting essentially of the cured reaction product of (1) the esterification reaction product of reactants consisting essentially of fumaric acid and a polyethylene glycol wherein said glycol has between 6 and 26 carbon atoms and said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

12. A sheet of polymethyl methacrylate having bonded thereto a hard mar-resistant cross-linked unsaturated polyester resin composition consisting essentially of the cured reaction product of (1) the esterification reaction product of reactants consisting essentially of fumaric acid and triethylene glycol, said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

13. A sheet of polymethyl methacrylate having bonded thereto a hard mar-resistant cross-linked unsaturated polyester resin composition consisting essentially of the cured reaction product of (1) the esterification reaction product of reactants consisting essentially of fumaric acid and triethylene glycol, said product has an acid number below about 30 and (2) ethylene glycol dimethyacrylate wherein (2) is present in an amount varying between about 10% and 40% by weight based on the total weight of (1) and (2).

14. A sheet of polymethyl methacrylate having bonded thereto a hard mar-resistant cross-linked unsaturated polyester resin composition consisting essentially of the cured reaction product of (1) the esterification of fumaric acid and triethylene glycol, said product has an acid number below about 30 and (2) triethylene glycol dimethacrylate wherein (2) is present in an amount varying between about 10% and 40% by weight based on the total weight of (1) and (2).

15. A sheet of polymethyl methacrylate having bonded thereto a hard mar-resistant cross-linked unsaturated polyester resin composition consisting essentially of the cured reaction product of (1) the esterification reaction product of reactants consisting essentially of fumaric acid and triethylene glycol, said product has an acid number below about 30 and (2) tetraethylene glycol dimethacrylate wherein (2) is present in an amount varying between about 10% and 40% by weight based on the total weight of (1) and (2).

References Cited by the Examiner

UNITED STATES PATENTS

| | | | |
|---|---|---|---|
| 2,645,626 | 7/1953 | Nordlander et al. | 260—872 |
| 2,884,404 | 4/1959 | Parker | 260—872 |

MURRAY TILLMAN, *Primary Examiner.*

J. T. GOOLKASIAN, *Assistant Examiner.*